United States Patent [19]

Ardalan et al.

[11] Patent Number: 4,677,668
[45] Date of Patent: Jun. 30, 1987

[54] ECHO CANCELLER USING PARAMETRIC METHODS

[75] Inventors: Sasan H. Ardalan; Samuel T. Alexander, both of Raleigh, N.C.

[73] Assignee: North Carolina State University, Raleigh, N.C.

[21] Appl. No.: 605,863

[22] Filed: May 1, 1984

[51] Int. Cl.[4] .............................................. H04B 3/20
[52] U.S. Cl. .................................... 379/411; 379/410
[58] Field of Search ............... 179/170.2, 170.6, 170.8; 370/32

[56] References Cited

U.S. PATENT DOCUMENTS

| 4,057,696 | 11/1977 | Gitlin et al. | 179/170.2 |
| 4,479,036 | 10/1984 | Yamamoto et al. | 179/170.2 |
| 4,531,220 | 7/1985 | Brie et al. | 375/14 |

FOREIGN PATENT DOCUMENTS

| 58-90832 | 5/1983 | Japan . |
| 58-138132 | 8/1983 | Japan . |

OTHER PUBLICATIONS

"A High Speed Digital Adaptive Echo Canceller", N. Demytko et al., Austrialian Telecommunications Research, vol. No. 1, 1973, pp. 20-8.
"Echo Cancellation on Time-Variant Circuits", N. Demytko et al., Proceedings of the IEEE, vol. 65, No. 3, Mar. 1977, pp. 444–53.
Lannart Ljung et al., Fast Calculation of Gain Matrices for Recursive Estimation Schemes, Int. J. Control, 1978, vol. 27, No. 1, 1–19.

Primary Examiner—Thomas W. Brown
Assistant Examiner—R. Vaas
Attorney, Agent, or Firm—Bell, Seltzer, Park & Gibson

[57] ABSTRACT

A parametric echo canceller comprising two transversal filters is employed to recursively model the echo path. The first transversal filter receives the input signal, the fed-back echo residual signal and a first set of Kalman gain coefficients to produce a first intermediate result. The second transversal filter receives the echo signal, the fed-back echo residual signal and a second set of Kalman gain coefficients to produce a second intermediate result. The second intermediate result is subtracted from the first to yield an estimated echo replica. The estimated echo replica is then subtracted from the echo to yield an echo residual. The taps of the first and second transversal filters are weighted in accordance with first and second sets of weighting coefficients, which are generated in accordance with the Fast Kalman Algorithm.

17 Claims, 7 Drawing Figures

ECHO CANCELLER USING PARAMETRIC METHODS

FIELD OF THE INVENTION

This invention relates to an adaptive echo canceller which cancels an echo signal by successively estimating the transmission characteristic of an echo path by the use of a received signal, an echo signal, and a fed back echo residual signal.

BACKGROUND OF THE INVENTION

Modern communication systems have become extremely complex in recent years with the development of new technologies which include global satellite network links. One of the problems associated with these extremely long distance networks is the addition of an undesirable echo signal component to the information containing signal (audio, data, video, etc.).

Echo is caused when the electrical signal encounters impedance mismatches along the transmission path. As a result, a portion of the information containing signal is reflected back towards its source. This reflected signal is commonly referred to as "echo."

The most serious mismatch or defect in the transmission path, and hence the greatest source of echo, usually occurs at the receiving end. This receiving end is commonly referred to as the "customer loop." At the customer loop, the information signal is carried by a system which changes from four wires to two wires. This junction, called the hybrid interface, is the main cause of echo in the telephone transmission circuit. Therefore, efforts to eliminate echos have been directed at this interface.

Early attempts at eliminating echo employed the technique of echo suppression. A typical communications link, includes a far end speaker and a near end speaker. When the far end speaker talks, the echo suppressor switches on, and disables the return path. When the far end speaker talks, the echo suppressor switches on, and disables the return path. When the far end speaker stops talking, a break-in circuit in the suppressor enables the send path. Complex problems are associated with echo suppression during periods of double talk, or when one speaker is speaking softly in comparison to the other.

Echo suppression techniques appeared to present an acceptable solution to the problem for local, primarily voice signals. However, for ultra-long distance signals, such as those which include satellite transmissions, delays of 600 milliseconds or longer are encountered and circuits using conventional echo suppressors are significantly worse than comparable circuits with pure delay and no source of echo. The circuits exhibit cutting, fading and other signal changes which result in speech degradation. These effects are attributable to the voice switch operation of echo suppression methods. Representative echo suppressors containing a more in depth explanation of their operation may be found in U.S. Pat. No. 3,937,907 to Campanella.

In response to the known limitations inherent in echo suppression (signal degredation), alternative methods of eliminating this undesirable signal component in the transmitted messages were developed. This new class of devices known as echo cancellers does not interrupt the send line, but generates an approximation $\hat{y}(t)$, of the echo $y(t)$. The echo approximation $\hat{y}(t)$ is then subtracted from the actual echo value $y(t)$, and under optimal conditions the difference is zero, resulting in complete echo cancellation. However, both design and practical limitations prohibit complete echo cancellation at all times, as a result the signal appearing on the send line is $x(t)+e(t)$, where $x(t)$ is the local information signal, and $e(t)$ is the residual echo caused by $y(t)$ not being exactly equal to $\hat{y}(t)$.

An excellent in-depth exposition of the principles of echo cancellation is contained in the paper "Echo Cancellation on Time-Variant Circuits" by N. Demytko and K. English, *Proceedings of the IEEE*, Vol. 65, No. 3, March 1977, pages 444–453. Briefly summarizing, echo reduction is achieved by applying the receive-in signal to an estimate of the echo path transfer function and subtracting the synthesized replica of the echo from the send-in signal path. Conceptually, the echo component is cancelled without blocking the complete send-side signal.

Generally speaking, echo cancellers are best implemented in digital adaptive filters. The adaptive filter continuously adapts to the echo path impulse response. Real-time algorithms have been developed for determining the optimum coefficients of the adaptive filter. The mathematical basis of the established algorithms is the well-known "method of steepest descent." Increments are added to each coefficient setting in the direction of the negative gradient of an optimality criterion.

Echo cancellers based on the method of steepest descent or gradient search algorithm have been fabricated using VLSI technology. These cancellers inherently include some rather severe limitations, such as slow convergence rate, and poor approximation of the echo signal to be cancelled. Furthermore, the echo cancellation systems previously mentioned were of a high filter order and therefore, require a large fabrication area on VLSI chips. This results in low chip yield and concomitant high cost per unit.

The echo path may be modeled as the system's transfer function. This may be done be generating the system's impulse response or by locating its poles and zeros. The impulse response is a non-parametric n-point discrete approximation of the echo path. A deficiency common to impulse response based cancellers is that the unique characteristics of speech make it difficult to design a canceller with rapid convergence. In addition, these same speech characteristics require that the number of samples needed to reach an acceptable level of echo attenuation is on the order of hundreds, requiring equivalently large numbers of memory locations resulting in large integrated circuit size.

Parametric modeling on the other hand locates the poles and zeros of the echo path, thereby producing an exact model, rather than an approximation as in impulse response-based cancellers. Parametric, or systems identification filter modeling has been suggested, but the saving in number of coefficients required was thought to be offset by the necessarily complex control strategy, and a problem of stability. Demytko, supra at 446, and R. Wehrmann and W. Koch, "Transmission Characteristics of Echo Paths", Nachr. Tech., Vol. 25, page 162, 1972.

A recursive-like adaptive echo canceller has been proposed in U.S. Pat. No. 4,057,696 to Gitlin. Gitlin explicitly recognizes the difficulty of a true recursive adaptive echo canceller arrangement. "An inherent difficulty with the recursive arrangement is that its operation cannot be readily adapted by automatic control in order to minimize the mean squared residual echo. In a practical application, the recursive circuit is predicted not likely to converge to the operating point that will provide the most effective echo cancellation because characteristically there are several sub-optimum multiplier tap settings to which the adaptive algorithm can converge rather than an optimum unique minimum as in the case for the conventional feed forward echo canceller."

SUMMARY OF THE INVENTION

The present invention overcomes the deficiencies of the prior art by providing an adaptive echo canceller which parametrically models the echo path in terms of the transfer function poles and zeros. More specifically, the echo canceller is based on a class of numerical techniques known in the art as least squares methods, one of which is the Fast Kalman Algorithm. These techniques allow the echo cancellation problem to be cast as one of system identification. This approach allows the use of much shorter filter algorithms to estimate the system pole-zero parameters, which results in a substantial decrease in convergence time for the system identification algorithms. The Fast Kalman Parametric Echo Canceller has a convergence rate that is independent of speech correlation (statistics, eigen value spread), while the convergence rate of gradient based cancellers degraded considerably for correlated speech. This improvement is achievable through the use of least-squares adaptive algorithms which have convergence properties dependent only on adaptive filter length. As a result, the contemplated implementation uses not only previous speech inputs, but also the previous echoed speech outputs to formulate its own present output.

The echo canceller of the present invention employs two transversal filters. The first transversal filter receives the input signal x(t) which is convolved with a first set of weighting coefficients to produce a first intermediate result. A second transversal filter receives the echo y(t), and convolves the same with a second set of weighting coefficients to produce a second intermediate result. These intermediate results are then subtracted from one another yielding an echo replica ŷ(n). This echo replica ŷ(n) is then subtracted from the actual echo y(n), to thereby substantially cancel the echo. The remaining uncancelled echo is referred to as residual echo e(n). The first and second weighting coefficients are derived as functions of the fed back echo residual signal and respective first and second sets of Kalman gain coefficients. The sets of Kalman gain coefficients are, in turn, generated in accordance with the Fast Kalman Algorithm, as functions of the input signal and the echo signal.

MATHEMATICAL DEVELOPMENT OF PARAMETRIC ESTIMATION

Since the concepts embodied in this invention are such a radical departure from the prior art, it would be beneficial at this point to elaborate on the new mathematical methods which have been developed and which enable the construction of an echo canceller which models the echo path as a rational function having a finite number of poles and zeros. Parametric modelling enables the construction of an echo canceller which converges rapidly and which is capable of providing the high performance required by the ultra-long distance satellite links in use today.

As is well-known in the art a system may be identified by its impulse response. An equivalent model is to consider the system's transfer function H(z). From linear systems theory, we have $$H(z) = \sum_{n=\infty}^{\infty} h(n)z^{-n} \quad (1.1)$$

where h(n) is the discrete impulse response. In general, we can define H(z) by the rational form $$H(z) = \frac{c_0 + \sum_{i=1}^{M-1} c_i z^{-i}}{1 + \sum_{i=1}^{N} a_i z^{-i}} \quad (1.2)$$

Or, equivalently, $$Y(z) + \sum_{i=1}^{N} a_i Y(z) z^{-i} = \sum_{i=0}^{M-1} c_i X(z) z^{-i} \quad (1.3)$$

since $H(z) = Y(z)/X(z)$. Taking the inverse z-transform of (1.3) we get $$y(k) = \sum_{i=0}^{M-1} c_i x(k-i) - \sum_{i=1}^{N} a_i y(k-i) \quad (1.4)$$

If we define the vector $$b = [c_0 c_1 \ldots c_{M-1} a_1 a_2 \ldots a_N]^T \quad (1.5)$$

and the signal vector as $$\underline{x}(k) = \begin{vmatrix} x(k) \\ x(k-1) \\ \ldots \\ x(k-N+1) \\ -y(k-1) \\ -y(k-2) \\ \ldots \\ -y(k-N) \end{vmatrix}, \quad (1.6)$$

we can write (1.4) as $$y(k) = x^T(k)b. \quad (1.7)$$

Let the system measurement be $$z(k) = x^{T(k)b + v(k)}. \tag{1.8}$$

Then based upon the Kalman estimation algorithm we can write the state estimation update equation as $$\underline{b}(k) = \underline{b}(k-1) + \underline{K}(k)[z(k) - \underline{x}^T(k)\underline{b}(k-1)] \tag{1.9}$$

where $$\underline{K}(k) = \left[\sum_{i=1}^{k} \underline{x}(i)\underline{x}^T(i)\right]^{-1} \underline{x}(k). \tag{1.10}$$

In (1.10), x(k) is given by (1.6) with z(k−i) replacing y(k−1), and $$\hat{b}(k) = [\hat{c}_0(k)\hat{c}_1(k) \ldots \hat{c}_{M-1}(k)\hat{a}_1(k) \ldots \hat{a}_N(k)]^T. \tag{1.11}$$

The above method estimates the parameter vector b and is in the class of parametric identification methods. The estimation of the impulse response falls in the catagory of nonparametric methods.

THE FAST KALMAN ALGORITHM

The Kalman gain for the system identification problem was shown to be $$\underline{K}(n) = \left[\sum_{j=0}^{n} \underline{x}(j)\underline{x}^T(j)\right]^{-1} \underline{x}(n) \tag{2.1}$$

The vector x(n+1) is obtained from x(n) by shifting in the new element x(n+1) and shifting out x(n−N). Using the shifting property, Ljung, Morf and Falconer, "Fast Calculation of Gain Matrices for Recursive Estimation Schemes", Journal of Control, Vol. 27, No. 1, 1978, PP. 1-19 developed a fast estimation scheme to calculate K(n). Per time update, their method requires 10N+4 multiplication compared with $3N^2+3N$ multiplications that are required in the conventional Kalman method. Furthermore, since the evaluation of an N×N matrix is avoided considerable saving in storage is achieved for large N. Two algorithms are presented below for the parametric and nonparametric estimation methods.

ALGORITHM 1: NONPARAMETRIC ESTIMATION

Let $\{\xi(n)\}$ be a sequence of p-vectors such that $\xi(j)=0$ for $j<0$, and let $$x(n) = [\xi(n)\xi(n-1) \ldots \xi(n-N+1)]^T$$

then the quantity $$\underline{k}(n) = \left[\sum_{j=0}^{n} \underline{x}(j)\underline{x}(j)^T + \delta I\right]^{-1} \underline{x}(n)$$

can be determined recursively as $$\epsilon_0(n) = \xi(n) + A^T(n-1)\underline{x}(n) \tag{2.2}$$

$$A(n) = A(n-1) - \underline{k}(n)\epsilon_0^T(n) \tag{2.3}$$

$$\epsilon(n) = \xi(n) + A^T(n)\underline{x}(n) \tag{2.4}$$

$$\Sigma(n) = \Sigma(n-1) + \epsilon(n)\epsilon_0^T(n) \tag{2.5}$$

-continued $$k'(n) = \begin{vmatrix} \Sigma - 1(n)\epsilon(n) \\ \underline{k}(n) + A(n)\Sigma - 1(n)\epsilon(n) \end{vmatrix} \tag{2.6}$$

Partition k'(n) as $$k'(n) = \begin{vmatrix} \underline{m}(n) \\ \mu(n) \end{vmatrix} \begin{vmatrix} (Np) \times 1 \\ p \times 1 \end{vmatrix}$$

Let $$\eta_0(n) = \xi(n-N) + D^T(n-1)x(n+1) \tag{2.7}$$

$$D(n) = [D(n-1) - \underline{m}(n)\eta_0^T(n)][I - \mu(n)\eta_0^T(n)]^{-1} \tag{2.8}$$

$$\underline{k}(n+1) = \underline{m}(n) - D(n)\mu(n) \tag{2.9}$$

The initial conditions can be taken as $$k(1)=0, A(O)=0, \Sigma(0)=\delta I, D(0)=0. \tag{2.10}$$

In the above equations $\xi(n)$, $\epsilon_0(n)$, $\epsilon(n)$, $\mu(n)$, and $\eta_0(n)$ are p×1 vectors. In the non-parametric estimation problem applied to echo cancellation, p=1 and $\xi(n)=x(n)$.

APPLICATION TO PARAMETRIC ESTIMATION

In parametric estimation, the vector x*(n) is obtained by shifting in the scalars x(n+1) and y(n) and shifting out x(n−N+1), y(n−N) where x(n) can be the input to a system and y(n) the output.

$$x^*(n) = [x(n)x(n-1) \ldots x(n-N+1)y(n-1)y(n-2) \ldots y(n-N)]^T$$

Let $$x(n) = [x(n)y(n-1)x(n-1)y(n-2) \ldots x(n-N+1)y(n-N)]^T$$

then $$x^*(n) = \Psi x(n) \tag{2.11}$$

where $\Psi$ is a permutation matrix.

In this case $\xi(n) = [x(n)y(n-1)]^T$. Also, $$\underline{k}^*(n) = \left[\sum_{j=0}^{n} \underline{x}^*(j)\underline{x}^*(j)\right]^{-1} \underline{x}^*(n) = \tag{2.12}$$

$$\left[\Psi \sum_{j=0}^{n} \underline{x}(j)\underline{x}^T(j)\Psi^T\right]^{-1} \Psi\underline{x}(n)$$

$$\underline{k}^*(n) = \Psi^{-T}\left[\sum_{j=0}^{n} \underline{x}(j)\underline{x}^T(j)\right]^{-1} \underline{x}(n) = \Psi^{-T}\underline{k}(n).$$

Consequently, if x*(n) is obtained as a linear map of x(n), where x(n) has the shifting property described in the algorithm, then the gain matrix k'(n) associated with x*(n) can be obtained by the algorithm through equation (2.12). This leads to a general algorithm presented below.

ALGORITHM 2: PARAMETRIC ESTIMATION

Let $\{x(n)\}$ be a sequence of N-vectors, such that its components are shifted in some fashion as n increases.

Suppose that p new elements enter $x(n+1)$; collect these in the vector $\xi(n)$. At the same time p elements leave $x(n+1)$ (i.e. they belong to $x(n)$ but not to $x(n+1)$). Collect these in the vector $p(n)$. To describe the way in which the elements enter and leave, let $x'(n)$ be an extended $(N+p)$ vector containing the elements of $x(n)$ as well as those of $\xi(n)$. Assume that $$\Psi_F \underline{x}'(n) = \begin{vmatrix} \xi(n) \\ \underline{x}(n) \end{vmatrix} \quad (2.13)$$

$$\Psi_B \underline{x}'(n) = \begin{vmatrix} \underline{x}(n+1) \\ p(n) \end{vmatrix} \quad (2.14)$$

where $\Psi F'$ and $\Psi B'$ are permutation matrices (or in fact any orthonormal matrices). Assume that $\xi(j)=0, <j\ 0$. Then the quantity $$\underline{k}(n) = \left[ \sum_{j=1}^{n} \underline{x}(j) \underline{x}^T(j) + \delta I \right]^{-1} \underline{x}(n) \quad (2.15)$$

can be determined recursively as $$\epsilon_0(n) = \xi(n) + A^T(n-1)\underline{x}(n) \quad (2.16)$$

$$A(n) = A(n-1) - \underline{k}(n)\epsilon_0^T(n) \quad (2.17)$$

$$\epsilon(n) = \xi(n) + A^T(n)\underline{x}(n) \quad (2.18)$$

$$\Sigma(n) = \Sigma(n-1) + \epsilon(n)\epsilon_0^T(n) \quad (2.19)$$

$$\underline{k}'(n) = \Psi_F T \begin{vmatrix} \Sigma - 1(n)\epsilon(n) \\ \underline{k}(n) + A(n)\Sigma - 1(n)\epsilon(n) \end{vmatrix} \quad (2.20)$$

Partition $\Psi B' \underline{k}'(n)$ as $$\Psi_B \underline{k}'(n) = \begin{vmatrix} \underline{m}(n) \\ \mu(n) \end{vmatrix} \begin{vmatrix} N \times 1 \\ p \times 1 \end{vmatrix} \quad (2.21)$$

$$\eta_0(n) = p(n) + D^T(n-1)\underline{x}(n+1) \quad (2.22)$$

$$D(n) = [D(n-1) - \underline{m}(n)\eta_0^T(n)] [I - \mu(n)\eta_0^T(n)]^{-1} \quad (2.23)$$

$$\underline{k}(n+1) = \underline{m}(n) - D(n)\mu(n) \quad (2.24)$$

The initial conditions may be taken as $$k(1)=0, A(0)=0, \Sigma(0)=\delta I, D(0)=0. \quad (2.25)$$

In the echo cancellation problem $$\xi(n)=[x(n)y(n-1)]^T$$

and $$p(n)=[x(n-N+1)y(n-N)]^T$$

where $x(n)$ is the speech input sample and $y(n)$ is the echo sample.

In the parametric fast Kalman estimation algorithm $p=2$ and $20N+22$ multiplications are required compared to $3N^2+3N$ for the conventional method.

Figure 1:
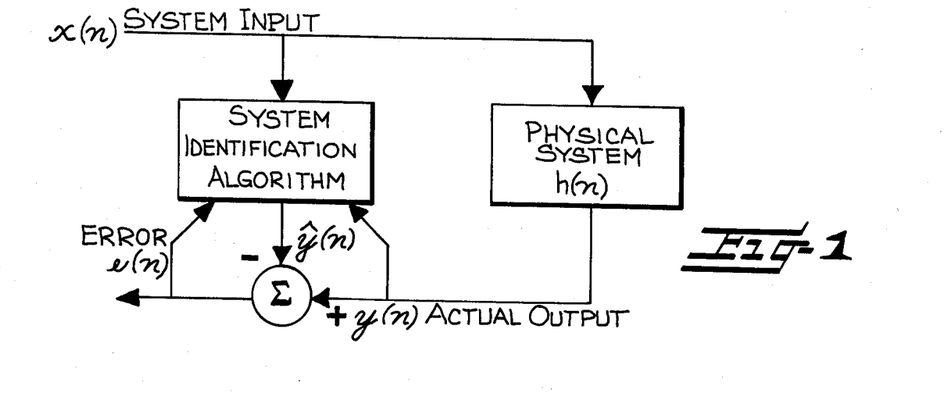
FIG. 1 is a general schematic diagram of a physical system including a system identification algorithm for cancelling echos.

Referring more particularly to FIG. 1, the goal of the echo cancellation system is to model the transfer function $H(z)$ of the physical system $h(n)$. This is accomplished in accordance with the present invention by a systems identification technique which locates the poles and zeros of the transfer function $H(z)$. The physical system includes an input $x(n)$ and an actual output $y(n)$. The echo canceller is interposed between the system input and the actual system output as shown in FIG. 1. Systems identifications techniques are employed to learn the system and thereby generate an error signal $e(n)$ which converges rapidly to zero. The canceller employs a systems identification algorithm based on least squares methods in which an error signal is derived from the difference between the estimated echo $y(n)$ and the actual system output $y(n)$. The canceller output is derived from the relationship between the system input $x(n)$, the actual output $y(n)$, and the feed back error signal $e(n)$, as more fully explained herein.

Figure 2:
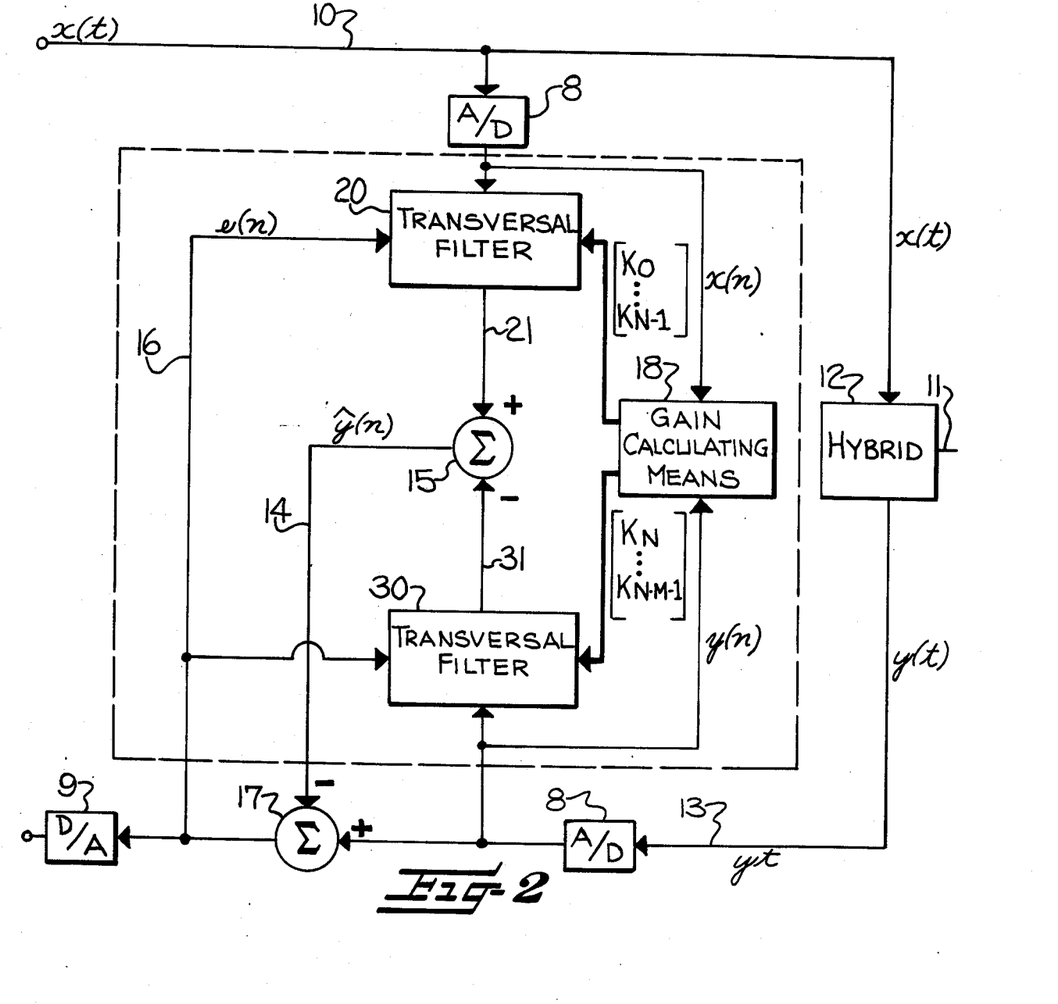
FIG. 2 is a more detailed schematic diagram of the echo cancelling system of FIG. 1.

Referring now to FIG. 2, the structure within the dotted lines represents the systems identification algorithm of FIG. 1. The echo canceller is illustrated in FIG. 2 in greater detail. For the sake of completeness analog-to-digital converters 8, are shown on the receiving, sending signal paths upon which $x(t)$, and $y(t)$ travel, respectively. A digital-to-analog converter 9 is also shown which converts the residual echo signal back to analog from for transmission to the far end speaker. Converters will be necessary to process non-digital signals, such as speech, and are unnecessary for signals already in digital form. Furthermore, it is presumed that sampling is done in accordance with the Nyquist criterion to assure accurate reconstruction of the analog signal. Also, it will be noted that the order of the Fast Kalman Parametric echo canceller is fixed with respect to sampling rate as long as the band limited condition of the echo path is satisfied. In contrast, for the non-parametric method, the number of taps increases proportional to the sampling rate.

The input signal $x(t)$ is carried by a four wire line on a receiving signal path 10 and is converted to a signal carried to a receiving station by a two wire line 11. A hybrid interface 12 is located between the aforementioned two and four wire lines. As previously stated, the major source of echo in the signal path of a communication system is the hybrid interface. The echo signal $y(t)$ emanates from the hybrid and travels down the sending signal path, indicated at 13, and if not effectively cancelled, will be heard by the far-end listener.

The signal path from which the echo arises may be modelled according to the expression:

$$H(z) = \frac{c_0 + \sum_{i=1}^{M-1} c_i z^{-i}}{1 + \sum_{i=1}^{N} a_i z^{-1}}$$

The numerator contains the system zeros which are calculated in a first adaptive signal processing means, shown in the form of a first transversal filter 20, the output of which is represented by a first intermediate result, indicated in FIG. 2 at 21. A second adaptive signal processing means, shown in the form of a second transversal filter 30, is employed to calculate the system poles, in accordance with the denominator of the above equation, the output of which is represented by a second intermediate result 31.

The echo replica signal $\hat{y}(n)$ indicated at 14 is the result of subtracting the second intermediate result from the first intermediate result 21, for example, in a combining network 15, which is well known in the art, such as a conventional summer. Similarly, the residual echo signal indicated at 16 is the result of subtracting the echo replica signal ŷ(n) from the actual echo signal y(n) in a second combining network 17.

The output of the second combining network e(n) represents the uncancelled echo signal which is fed back to both of the aforementioned transversal filters 20, 30 for use in a tap updating process described hereinafter in greater detail. The tap updating process is facilitated by two sets of weighting coefficients, directed to the respective first and second transversal filters. These coefficients are generated by a gain calculating means 18 in which the coefficients are calculated at each digital interval T as functions of both the input signal x(n) and the actual echo signal y(n).

Figure 3:
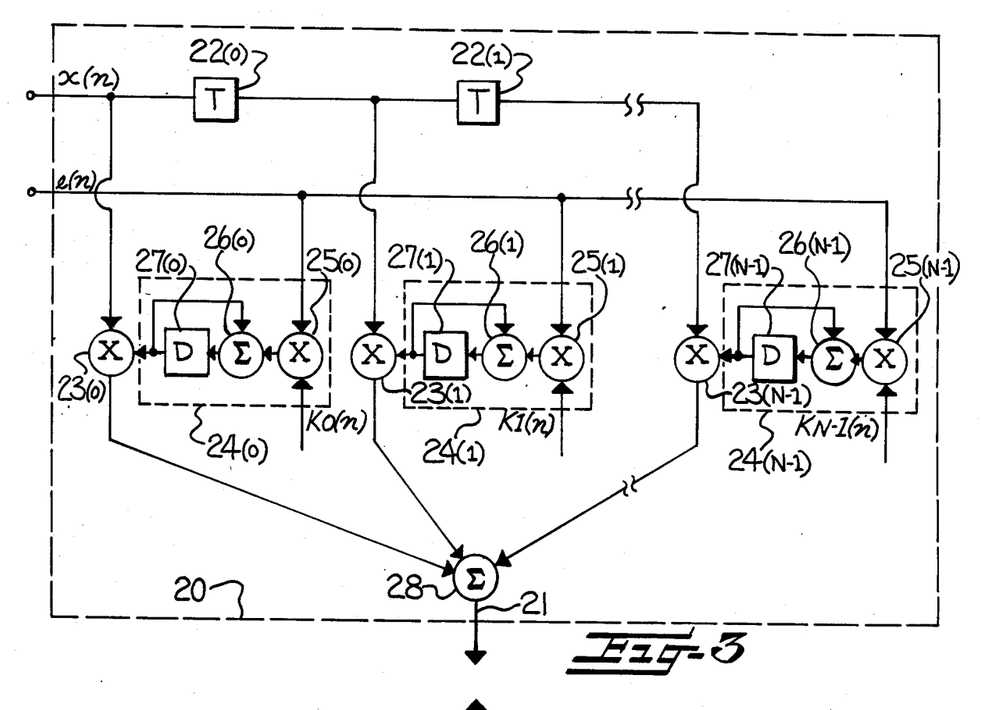
FIG. 3 is a schematic diagram of a first transversal filter as shown in the upper portion of FIG. 2.
Figure 4:
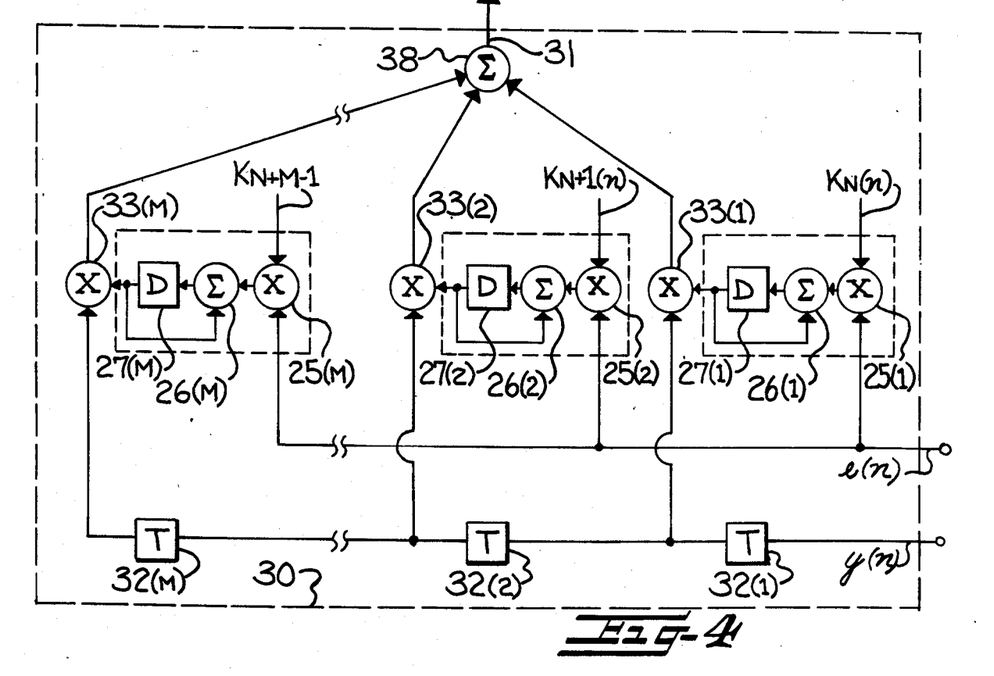
FIG. 4 is a schematic diagram of a second transversal filter as shown in the lower portion of FIG. 2.

FIGS. 3 and 4 are schematic representations of the aforementioned transversal filters 20, 30. Generally speaking, transversal filters per se are well known to those skilled in the art. It will be seen that in FIG. 3, the filter inputs comprise the input signal x(n), the echo residual signal e(n) and a Kalman gain coefficient vector $K_o(n)$ through $K_{N-1(n)}$. The filter output comprises the first intermediate result 21. The periodic samples of the input signal x(n) are stored in a section of nondispersive delay line (i.e., a shift register), of delay T which is equal to the digital interval T. More specifically, a symmetric tapped delay line is contemplated, wherein the interval between the samples is constant and equal to the time interval T. Simulations (discussed in greater detail hereinafter) show that the echo path may be modelled as an overspecified system having nineteen zeros and ten poles. As a result, a canceller may be constructed which incorporates a system of dual transversal filters which have twenty and ten taps, respectively.

FIG. 3 illustrates in greater detail the transversal filter 20 and the manner in which the signals are processed therethrough. The filter 20 comprises a tapped delay line, with a series of delay units 22(0) through 22(N−1) which collectively function as a shift register for successively imparting a series of delays of T seconds each to the input signal x(n). For each tap of the delay line, means (shown in the form of a tap weight multiplier 23) is provided for weighting the signal with a respective one of a first set of weighting coefficients. Means is also provided for generating and updating the respective weighting coefficients, shown in FIG. 3 within the dotted lines indicated at 24. More specifically, this weighting coefficient generating and updating means 24 includes a gain multiplier 25, an adder 26 and a delay unit 27. The respective weighted input signals are summed in an adder 28 to yield the first filter output or first intermediate result 21. The gain coefficient of each of gain multiplier 25 is set in accordance with the encoded polarity and magnitude provided by its respective delay unit 27 and associated adder 26. Each gain multiplier 25 receives the fed-back echo residual e(n) and a respective Kalman gain. Each of the Kalman gains is calculated in accordance with a least squares method, specifically, the Fast Kalman Algorithm, as a function of both x(n) and y(n), by the gain calculating means 18 of FIG. 2.

The second transversal filter 30, shown in FIG. 4, is constructed and operates in a manner similar to the first filter 20 previously described, making a detailed discussion thereof unnecessary. The elements in FIG. 4 which correspond to those in FIG. 3 bear reference numerals which have been increased by ten. A first difference is that a separate set of Kalman gain coefficients K(N) through K(N+M−1) are generated by the aforementioned gain calculating means 18. A second difference is that the input signal, in this case y(n), is delayed by one interval T, before being weighted by the current tap weight.

As previously mentioned, simulations have shown that the echo path poles are on the order of 10 and likewise the number of zeros is approximately 9, and it is contemplated that the transversal filters 20, 30 will have a like numbers of taps, respectively.

ECHO CANCELLATION SIMULATION RESULTS

In this section the results of the simulation of parametric and nonparametric fast Kalman algorithms for echo cancellation are presented. Additionally, the method employed to generate the voice echo is described.

Rather than assume the simple echo generation model of flat delay plus a simple attenuation of the original speech, an echo generation model which more accurately reflects the telecommunication link was selected. One of the most important components in the telephony environment is the bandpass filter which both rejects the 60 Hz line frequency and greatly attenuates components above approximately 3200 Hz for anti-aliasing purposes. A representative transfer function of this component is shown by the frequency response of the bandpass Infinite Impulse Response (IIR) filter shown in FIG. 5.

Figure 5:
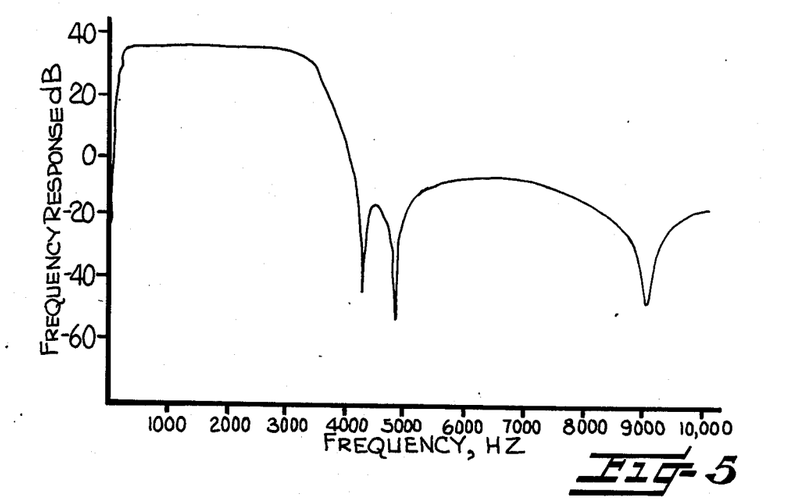
FIG. 5 is a graph illustrating a representative transfer function of a telecommunications link as shown by a Bandpass Infinite Impulse response filter.

The process was modeled as a flat delay followed by the input speech having been filtered by the bandpass IIR filter of FIG. 5. For implementation purposes, this filter consisted of a 6th order lowpass elliptic filter in cascade with a 4th order Chebyshev highpass filter.

For simulation purposes this model may be simplified to a consideration of simply the bandpass IIR filter, since the flat delay does not affect the adaptive filter convergence process. Typically, one may have an approximate knowledge of this flat delay and thus insert a bulk delay prior to the adaptive filter which more nearly aligns the time windows of the original and echoed speech. However, if one has no a priori knowledge of flat delay, then one must append delay taps to hold the entire range of possible delays. It should be mentioned, however, that these are really implementation considerations and do not affect the convergence nor cancellation properties of the fast Kalman method to be shown. A very important property of the echo model chosen is that the resulting impulse response of the bandpass line filter is an infinite impulse response. Theoretically, then, no transversal filter will be able to completely cancel the echo. However, since the parametric fast Kalman has the property of modeling system poles, the infinite impulse response may theoretically be cancelled.

Figure 6:
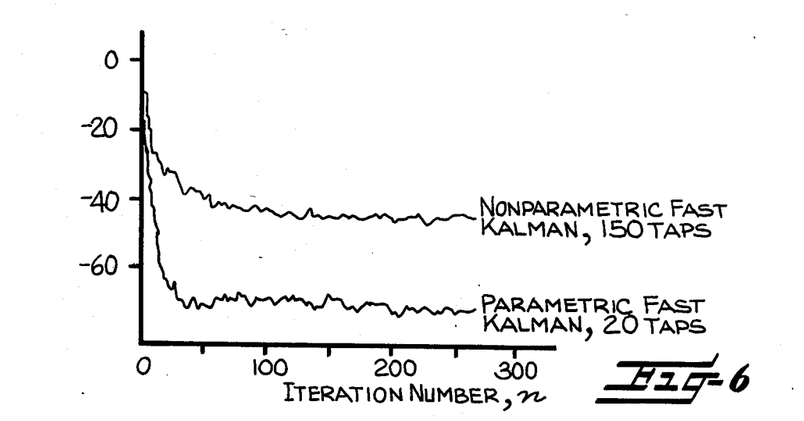
FIG. 6 is a graph comparing the relative convergence rates between non-parametric and parametric methods.

The performance effects of including system poles and zeroes in the cancellation is clearly shown in FIG. 6, in which the convergence of the parametric and the nonparametric fast Kalman algorithm are compared. The nonparametric algorithm was implemented as an L=150 coefficient transversal fast Kalman filter, and the parametric method employed 20 coefficients (M=10, N=9). The data was created by passing uncorrelated Gaussian noise through the $II_R$ line filter, and the curves are averages of 10 computer runs. From FIG. 6, the steady state cancellation error of the parametric method is seen to be approximately 70 dB below the original signal compared to 40 dB for the nonparametric method. This follows from the fact that for the nonparametric case the impulse response is truncated at 150 samples, whereas the impulse response of the bandpass IIR line filter is much larger than 150 samples. In contrast the parametric method is capable of modeling the finite order II$_R$ bandpass filter exactly. Furthermore, the parametric method converges within approximately 20 iterations, i.e., M+N+1 iterations, where M is the pole order (10) and N is the zero order (9). The significant improvement in the convergence rate of the parametric method over the nonparametric method is predicted and is quite clear from the simulation.

Figure 7:
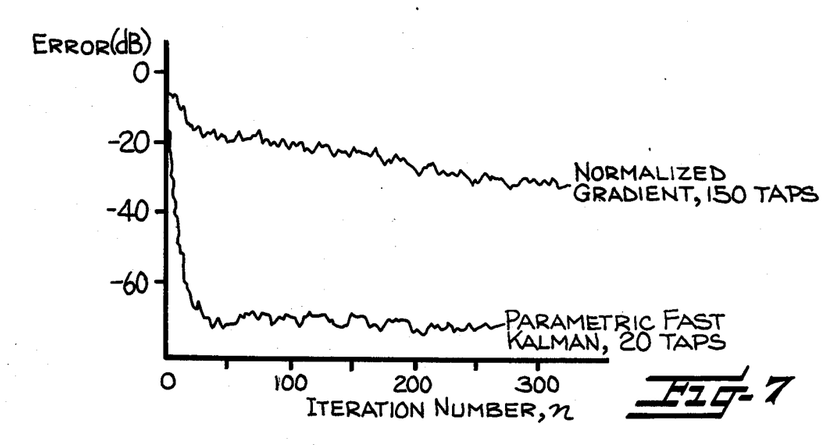
FIG. 7 is a graph comparing the relative convergence rates between filters using the normalized gradient and Parametric Fast Kalman algorithms.

The comparison in FIG. 7 shows the performance gain of the parametric fast Kalman method versus the normalized gradient method for echo cancellation. Uncorrelated Gaussian noise was passed through the 10th-order bandpass II$_R$ filter as in the previous case to produce the band-limited signal, which was then cancelled by a 150-tap transversal gradient filter and a 20-tap parameter fast Kalman filter. The normalized gradient method chosen:

$$\hat{\underline{h}}(n) = \hat{\underline{h}}(n-1) + \left[ \frac{g_1}{g_2 + \underline{x}^T(n)\underline{x}(n)} \right] e(n)\underline{x}(n),$$

which is a commonly used form of the gradient algorithm. Gibson, J. D., S. K. Jones, and J. L. Melsa, "Sequentially Adaptive Prediction and Coding of Speech Signals," *IEEE Trans. on Communications,* Vol. COM-22, pp. 1789-1797, November 1974. In the above equation g1 and g2 are normalizing constants. It can be seen in FIG. 7 that the convergence performance of the parametric fast Kalman is dramatically superior to that of the normalized gradient. Further, the steady state error of the parametric method is approximately 40 dB below that of the gradient canceller, due to the ability of the parametric fast Kalman method to model both the poles and zeroes of the IIR line filter.

In the drawings and specification there has been shown a preferred embodiment of the invention, and although specific terms are employed, they are used in a generic and descriptive sense only and not for purposes of limitation.

That which is claimed is:

1. In an echo cancellation system of the type which is interposed between a signal receiving path on which an input signal travels and a signal sending path on which an unwanted echo signal travels, and which includes means for generating an echo replica signal which is subtracted from the echo signal to produce an echo residual signal; the combination which comprises:

first adaptive signal processing means connected to receive the input signal from said receiving path and to receive a fed-back echo residual signal, and operable for performing convolution of the input signal with a signal based upon the fed-back echo residual signal to produce a first intermediate result which defines the system zeros of the signal path;

second adaptive signal processing means connected to receive the echo signal from said sending path and to receive the fed-back echo residual signal, and operable for performing convolution of the echo signal with a signal based upon the fed-back echo residual signal to produce a second intermediate result which defines the system poles of the signal path; and means for combining said first and second intermediate results and said echo signal to yield the echo residual signal.

2. The combination of claim 1 wherein said means for combining the first and second intermediate results and the echo signal comprises a first combining means connected to receive said first and second intermediate results and operable for subtracting the second intermediate result from the first intermediate result to produce the echo replica signal, and a second combining means connected to receive said echo signal and said echo replica signal and operable for subtracting the echo replica signal from the echo signal to yield said echo residual signal.

3. The combination of claim 1 wherein said first adaptive signal processing means includes a transversal filter including means for storing a first set of weighting coefficients, and means for updating the first set of weighting coefficients based upon the fed-back echo residual signal, and wherein said second adaptive signal processing means includes a transversal filter including means for storing a second set of weighting coefficients, and means for updating the second set of weighting coefficients based upon the fed-back echo residual signal.

4. The combination of claim 3 also comprising means connected for receiving the input signal and the echo signal and operable for deriving therefrom respective first and second sets of gain coefficients, and wherein said means for updating the respective first and second sets of weighting coefficients are also connected for respectively receiving said first and second sets of gain coefficients.

5. The combination of claim 4 wherein said means for deriving said first and second sets of gain coefficients comprises means operable for deriving said sets of gain coefficients in accordance with a least squares method.

6. The combination of claim 4 wherein said means for deriving said first and second sets of gain coefficients comprises means operable for deriving said sets of gain coefficients in accordance with the Fast Kalman Algorithm.

7. In an echo cancellation system of the type which is interposed between a signal receiving path on which an input signal travels and a signal sending path on which an unwanted echo signal travels, and which includes means for generating an echo replica signal which is subtracted from the echo signal to produce an echo residual signal; the combination which comprises;

first adaptive signal processing means connected to receive the input signal from said receiving path and to receive a fed-back echo residual signal, and operable for convolving the input signal with a first set of weighting coefficients which define the system zeros of the signal path, to produce a first intermediate result;

second adaptive signal processing means connected to receive the echo signal from said sending path and to receive the fed-back echo residual signal, and operable for convolving the echo signal with a second set of weighting coefficients which define the system poles of the signal path, to produce a second intermediate result; and means for combining said first and second intermediate results and said echo signal to yield the echo residual signal.

8. The combination of claim 7 wherein said means for combining the first and second intermediate results and the echo signal comprises a first combining means connected to receive said first and second intermediate results and operable for subtracting the second intermediate result from the first intermediate result to produce the echo replica signal, and a second combining means connected to receive said echo signal and said echo replica signal and operable for subtracting the echo replica signal from the echo signal to yield said echo residual signal.

9. The combination of claim 7 wherein said first adaptive signal processing means includes a transversal filter including means for storing said first set of weighting coefficients, and means for updating said first set of weighting coefficients based upon the fed-back echo residual signal, and wherein said second adaptive signal processing means includes a transversal filter including means for storing said second set of weighting coefficients, and means for updating said second set of weighting coefficients based upon the fed-back echo residual signal.

10. The combination of claim 9 also comprising means connected for receiving the input signal and the echo signal and operable for deriving therefrom respective first and second sets of gain coefficients, and wherein said means for updating the respective first and second sets of weighting coefficients are also connected for respectively receiving said first and second sets of gain coefficients.

11. The combination of claim 10 wherein said means for deriving said first and second sets of gain coefficients comprises means operable for deriving said sets of gain coefficients in accordance with a least squares method.

12. The combination of claim 10 wherein said means for deriving said first and second sets of gain coefficients comprises means operable for deriving said sets of gain coefficients in accordance with the Fast Kalman Algorithm.

13. In an echo cancellation system of the type which is interposed between a signal receiving path on which an input signal travels and a signal sending path on which an unwanted echo signal travels, and which includes means for generating an echo replica signal which is subtracted from the echo signal to produce an echo residual signal; the combination which comprises:

first adaptive signal processing means including a first delay line connected for receiving the input signal and having a plurality of taps, means forming a first set of weighted tap signals by weighting the signals at the respective taps of the first delay line by a respective first set of weighting coefficients which define the system zeros of the signal path, means for combining the first set of weighted tap signals to produce a first intermediate result and means connected for receiving a fed-back echo residual signal and operable for updating the respective first set of weighting coefficients based upon the fed-back echo residual signal;

second adaptive signal processing means including a second delay line connected for receiving the echo signal and having a plurality of taps, means forming a second set of weighted tap signals by weighting the signals at the respective taps of the second delay line by a respective second set of weighting coefficients which define the system poles of the signal path, means for combining the second set of weighted tap signals to produce a second intermediate result, and means connected for receiving the fed-back echo residual signal and operable for updating the respective second weighting coefficients;

means for subtracting the second intermediate result from the first intermediate result to produce the echo replica signal;

means for subtracting the echo replica signal from the echo signal to yield the echo residual signal; and means for feeding the echo residual signal back to said first and second adaptive signal processing means.

14. The combination of claim 13 wherein said means for updating the respective weighting coefficients in each of said first and second signal processing means each includes means for adjusting the fed-back echo residual signal at the respective taps.

15. The combination of claim 14 wherein said means for adjusting the fed-back echo residual signal at the respective taps includes means for storing respective sets of gain coefficients derived from the input signal and the echo signal and means for recursively updating the respective sets of gain coefficients.

16. The combination of claim 15 wherein said means for recursively updating the respective sets of gain coefficients is operable for deriving said sets of gain coefficients based upon a least squares method.

17. The combination of claim 15 wherein said means for recursively updating the respective sets of gain coefficients is operable for deriving said sets of gain coefficients based upon the Fast Kalman Algorithm.

* * * * *

UNITED STATES PATENT AND TRADEMARK OFFICE
CERTIFICATE OF CORRECTION

PATENT NO. : 4,677,668
DATED : June 30, 1987
INVENTOR(S) : Sasan H. Ardalan and Samuel T. Alexander Page 1 of 2

It is certified that error appears in the above-identified patent and that said Letters Patent is hereby corrected as shown below:

Column 2, line 6, "y(t)" should be -- $\hat{y}(t)$ --.

Column 3, line 44, "y(n)" should be -- $\hat{y}(n)$ --.

Column 4, line 52, "b" should be -- $\underline{b}$ --.

Column 4, line 66, "y(k)=$x^T$(k)b" should be -- y(k)=$\underline{x}^T$(k)$\underline{b}$ --.

Column 5, line 1, "z(k)=$x^T$(k)b + v(k)" should be -- z(k)=$\underline{x}^T$(k)$\underline{b}$ + v(k) --.

Column 5, line 17, "$\hat{b}$(k)=" should be -- $\hat{\underline{b}}$(k)= --.

Column 5, line 52, "x(n)=" should be -- $\underline{x}$(n)= --.

Column 6, line 14, "$\eta_0$(n) = $\xi$(n-N)+$D^T$(n-1)x(n+1)" should be
-- $\eta_0$(n) = $\xi$(n-N)+$D^T$(n-1)$\underline{x}$(n+1) --.

Column 6, line 16, "D(n)=[D(n-1)-m(n)$\eta_0^T$(n)] should be
-- D(n) = [D(n-1)-$\underline{m}$(n)$\eta_0^T$(n)] --.

Column 6, line 18, "k(n+1)=m(n)" should be -- $\underline{k}$(n+1)=$\underline{m}$(n) --.

Column 6, line 34, "x*(n)=" should be -- $\underline{x}$*(n)= --.

Column 6, line 38, "x(n)=" should be -- $\underline{x}$(n)= --.

Column 6, line 43, "x*(n)=$\Psi$x(n)" should be -- $\underline{x}$*(n)=$\Psi\underline{x}$(n) --.

Column 6, line 68, "$\{$x(n)$\}$" should be -- $\{\underline{x}$(n)$\}$ --.

Column 7, line 1, "x(n+1)" should be -- $\underline{x}$(n+1) --.

Column 7, line 3, "x(n+1)" should be -- $\underline{x}$(n+1) --.

UNITED STATES PATENT AND TRADEMARK OFFICE
CERTIFICATE OF CORRECTION

PATENT NO. : 4,677,668

DATED : June 30, 1987

INVENTOR(S) : Sasan H. Ardalan and Samuel T. Alexander

It is certified that error appears in the above-identified patent and that said Letters Patent is hereby corrected as shown below:

(Continued)

Column 7, line 5, "x'(n)" should be -- $\underline{x}'(n)$ --.

Column 7, line 7, "x(n)" should be -- $\underline{x}(n)$ --.

Column 7, line 10, "$\Psi F \underline{x}'(n) =$" should be -- $\Psi F' \underline{x}'(n) =$ --.

Column 7, line 35, "$\underline{k}'(n) = \Psi F^T$" should be -- $\underline{k}'(n) = \Psi F'^T$ --.

Column 7, line 52, "k(1)=0" should be -- $\underline{k}(1) = \underline{0}$ --.

Signed and Sealed this

Twenty-second Day of December, 1987

Attest:

DONALD J. QUIGG

Attesting Officer

Commissioner of Patents and Trademarks